United States Patent [19]
Yamagishi et al.

[11] Patent Number: 5,260,738
[45] Date of Patent: Nov. 9, 1993

[54] CAMERA DEVICE AND METHOD FOR SUPPLYING A REDUCED LEVEL OF ENERGY TO A CHARGING DEVICE WHILE ENERGY IS SUPPLIED TO A SECONDARY DEVICE

[75] Inventors: Yoichi Yamagishi; Hirokazu Takahashi, both of Yokohama, Japan

[73] Assignee: Canon Kabushiki Kaisha, Tokyo, Japan

[21] Appl. No.: 790,448

[22] Filed: Nov. 12, 1991

[30] Foreign Application Priority Data

Nov. 15, 1990 [JP] Japan .................. 2-307243
Nov. 15, 1990 [JP] Japan .................. 2-307244

[51] Int. Cl.⁵ .................. G03B 15/05; H04N 5/30
[52] U.S. Cl. .................. 354/413; 358/209; 358/906
[58] Field of Search .............. 354/484, 412, 413, 418, 354/126, 127.1, 127.11, 127.12, 145.1; 358/906, 909, 209

[56] References Cited

U.S. PATENT DOCUMENTS

| | | | |
|---|---|---|---|
| 4,561,754 | 12/1985 | Matsuyama | 354/484 |
| 4,608,605 | 8/1986 | Okino | 358/209 |
| 4,755,885 | 7/1988 | Okino et al. | 358/335 |
| 4,908,552 | 3/1990 | Kumakura | 315/241 |
| 5,113,210 | 5/1992 | Kashiyama et al. | 354/484 X |

FOREIGN PATENT DOCUMENTS

| | | |
|---|---|---|
| 3103598 | 12/1981 | Fed. Rep. of Germany . |
| 60-170380 | 9/1985 | Japan .................. 358/906 |
| 63-149632 | 6/1988 | Japan . |
| 2-46436 | 2/1990 | Japan . |

OTHER PUBLICATIONS

Japanese Patent Abstract, vol. 14, No. 207 (P-1043), published Apr. 26, 1990.
Japanese Patent Abstract, vol. 012, No. 413 (P-780), published Nov. 2, 1988.
"Still video still here?", Electronics World+Wireless World, vol. 96, No. 1656, Sutton, G. B., pp. 873-876 (Oct. 1990).

*Primary Examiner*—W. B. Perkey
*Attorney, Agent, or Firm*—Fitzpatrick, Cella, Harper & Scinto

[57] ABSTRACT

A still camera having at least one motor or a recording circuit, in addition to a flash device. The flash device includes a charging circuit for accumulating charge. The charging circuit can carry out a charging operation while the motor or the recording circuit is actuated but the charging current is reduced to some extent, so as not to demand an excessive current from a battery power supply and to prevent excessive audible oscillator noise, while minimizing the total charging period. The invention is particularly advantageous in electronic still cameras.

12 Claims, 13 Drawing Sheets

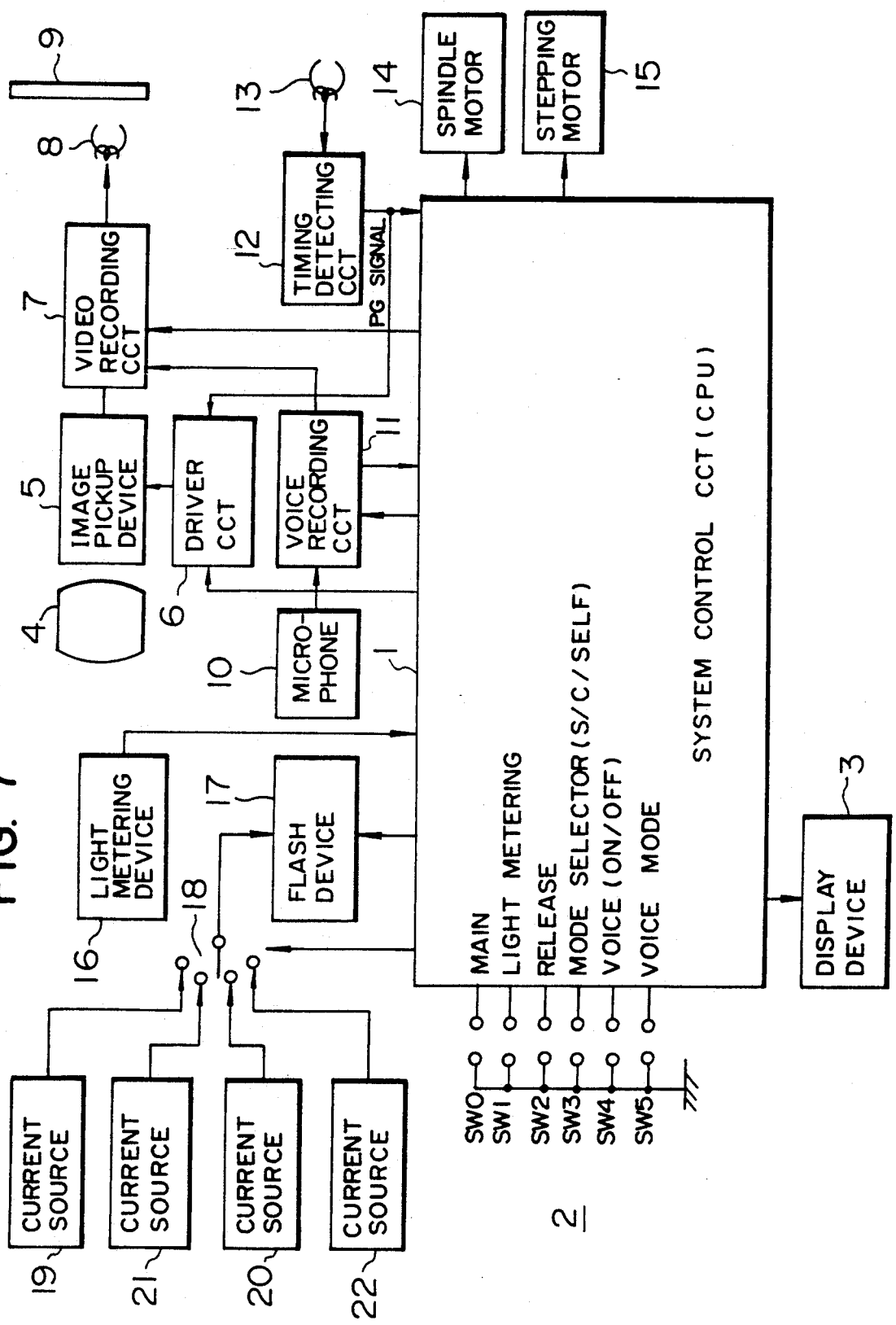

FIG.14

| OUTPUT OF THE SYSTEM CONTROLLER 108 | OUTPUT OF THE ANDGATE 1 | OUTPUT OF THE ANDGATE 2 | CONDITION OF THE SWITCH SW Y |
|---|---|---|---|
| 1 | 1 | 1 | CONDUCTIVE LINE |
| 1 | 1 | 0 | R2 |
| 1 | 0 | 1 | R2 |
| 1 | 0 | 0 | R1 |
| 0 | 1 | 1 | OPEN |
| 0 | 1 | 0 | OPEN |
| 0 | 0 | 1 | OPEN |
| 0 | 0 | 0 | OPEN |

CAMERA DEVICE AND METHOD FOR SUPPLYING A REDUCED LEVEL OF ENERGY TO A CHARGING DEVICE WHILE ENERGY IS SUPPLIED TO A SECONDARY DEVICE

FIELD OF THE INVENTION

This invention relates to a camera for taking still pictures, which has a flash device and means for supplying electrical energy to said device.

PRIOR ART

Cameras for taking still pictures are known which operate with a flash, some of which have a built in flash device. The operation of a flash requires a significantly large current for a substantially short period of time, therefore it is known to provide the camera or the flash device with an accumulating means, such as a capacitor which is charged, over a period of time, from a battery. Thus, when taking a sequence of photographs with a flash, a photographer must wait for a period of time for the accumulator to receive sufficient charge from the battery.

In recent years, demand has grown for flash systems with smaller and smaller charge-up times, thus reducing the period between successive operations of the flash device. Thus, flash systems are known which have quick charging, provided by supplying a relatively high current from the battery to the accumulator.

In addition to providing improved flash systems, many modern cameras also include other power driven devices, including motor drives, zoom drives and electronic devices for recording audio messages, such as vocal descriptions of scenes being photographed. Such devices also require energy from a battery. However, when the flash accumulator requires energy from the battery, the amount of power taken is, in known systems, relatively large, particularly when the system is designed to provide quick charging. Thus, a problem in using the same battery for charging the flash unit and for supplying power to other devices (power driven lenses and voice recorders etc) is that, during periods of charge accumulation within the flash unit, insufficient power may be available from the battery for the satisfactory operation of these devices. A further problem, when supplying power to a voice recording unit, is that known flash units include an oscillator for chopping the dc input voltage. This oscillator usually oscillates at audio frequencies, thus when a voice recorder is provided, the recorder may record this tone in addition to the voice signal.

It has been proposed to inhibit operation of the flash while operating the other devices, but the problem with this approach is that the charge-up time for the flash is increased significantly. Alternatively, the flash may be given priority and other devices may not operate until the flash is fully charged. A problem with this approach is that use of the other devices may be restricted severely. For example, not being able to make a voice recording immediately after a picture has been taken would place a severe limitation on the usefulness of such a facility.

In particular, when using an electronic still camera in a continuous phototaking mode, the phototaking operation and the voice recording operation are carried out alternately, and the voice recording operation should be carried out almost continuously by using a buffer memory. However if the voice recording operation is stopped during the charging operation of the flash device, the recorded voice is degraded severely.

This kind of problem is seen even in the electronic still camera that does not have the voice recording function. For example in the prior art, for preventing voltage drops during driving a spindle motor or a zoom motor, the charging operation of the flash device cannot be carried out during the driving period of the motors.

As explained above, in the prior art, the charging operation of the flash device cannot be carried out during the voice recording operation or motor driving operation, so that for example, especially in the continuous phototaking mode which uses the flash device or in the case of a phototaking operation being carried out after a motor driven zooming operation, the charging operation of the flash device cannot take place. Therefore, if the timing of phototaking is given priority, the amount of flash light becomes insufficient. Conversely, if the charging operation of the accumulating operation is given priority, phototaking chances may be missed.

SUMMARY OF THE PRESENT INVENTION

An object of the present invention is to provide an improved still camera. Another object is to provide an improved still camera which can avoid shortages of flash light, the missing of phototaking opportunities or the introduction of time lags in voice recording operations.

According to a first aspect of the invention, there is provided a camera for taking still pictures, comprising a flash device for illuminating a scene; a source of electrical energy; a charging device arranged to receive energy from said source and to supply energy to said flash device; and a secondary device arranged to receive energy from said source; characterized by control means for supplying a reduced level of energy to said charging device while energy is being supplied to said secondary device.

In a preferred embodiment, the control means provides rapid charging of said charging device when said secondary device is not being operated. Said secondary device may be a voice recording circuit and, in the preferred embodiment, said recording device has a plurality of settings and energy supplied to said charging circuit under control of the control circuit may be varied with said settings.

In a preferred embodiment, the camera is an electronic still camera arranged to record an image electronically.

According to a second aspect of the present invention, there is provided a method of charging a charging device of a flash device in a still camera having a secondary powered device; characterized by supplying a reduced current to a said charging device while current is being supplied to said secondary device. Preferably, the charging device is rapidly charged when current is not being supplied to said secondary device.

BRIEF DESCRIPTION OF THE DRAWINGS

FIG. 7 illustrates a schematic circuit diagram of a second embodiment of the present invention;

FIG. 14 illustrates a table for explaining a selection of current restricting registers.

DETAILED DESCRIPTION OF THE ILLUSTRATED EMBODIMENT

Figure 1:
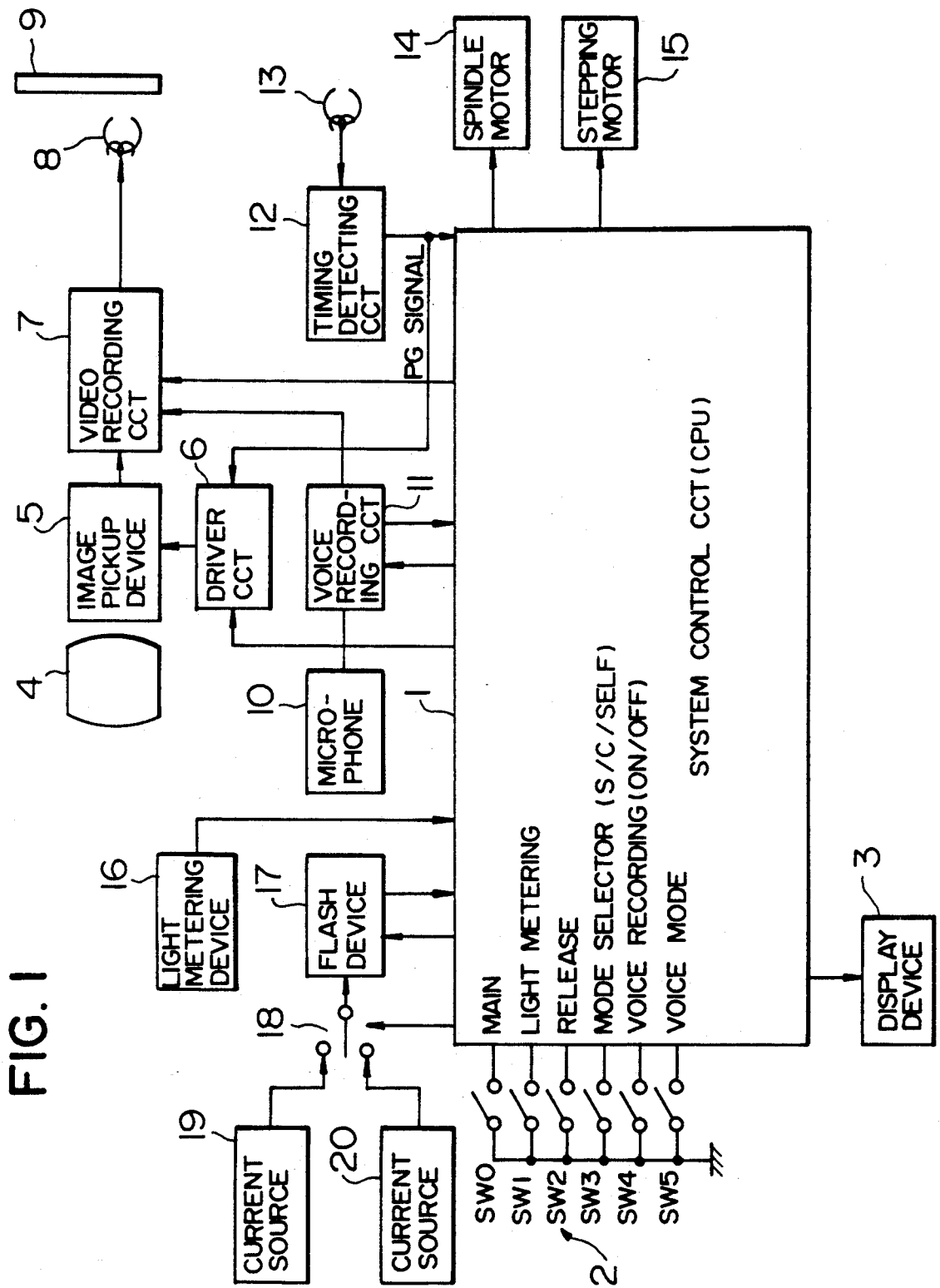
FIG. 1 illustrates a schematic circuit diagram of an electronic still camera of a first embodiment of the present invention.

FIG. 1 illustrates a schematic circuit diagram of the first embodiment of the present invention. In the figure, a system control circuit 1 has a central processing unit and a group of switches 2, each connected to the system control circuit 1, for supplying command information to an input. A display device 3 is connected to the system control circuit 1 for indicating a condition of the camera. A lens 4 is located in front of an image pick up device 5 such as a charge coupled device (CCD) and a driving circuit 6 is connected to the image pick up device 5 to drive it in accordance with a phase generation (PG) signal generated in synchronism with a rotation of a magnetic disk 9 and a control signal generated in the system control circuit 1.

A microphone 10 is connected to a voice circuit 11 for time compressing a voice signal and an output from the voice circuit 11 is connected to a video recording circuit 7. Circuit 7 modulates a video signal from the image pick up device along with the voice signal from the voice circuit 11 and supplies the modulated signals to a magnetic head 8, for recording onto the magnetic disk 9. A PG coil 13 is located near a rotating shaft of the magnetic disk 9 for detecting a rotational phase of the shaft, by sensing magnetic fields of a magnet implanted in the shaft. A timing deduction circuit 12 is connected to the PG coil 13 for generating a pulse signal and the PG signal. A spindle motor 14 is connected to the magnetic disk 9 through the shaft for rotating the disk 9 at a predetermined rotational speed. A stepping motor 15 is connected to the magnetic head 8, for accessing a predetermined address of the magnetic disk 9. A light metering device 16 comprises a light metering sensor and an output from the light metering device is connected to the system control circuit 1, to make the driver circuit 6 control an exposure period of the image pick up device 5 through the system control circuit 1.

A flash device 17 is connected to the system control circuit 1 and is arranged to illuminate an object when it receives a command signal from the system control circuit 1, identifying that additional light is required. The flash device requires to be charged prior to use and the charging operation of the flash device 17 is carried out according to a signal from the system control circuit 1. When the charging operation is finished, a charging completion signal is supplied to an output or the system control circuit 1, from the flash device 17.

The group of switches 2 comprises a main switch SW0, for activating the system; a switch SW1 for producing a signal for starting a light metering operation in advance of a photo-taking operation; a release switch SW2 for producing a signal for starting the phototaking operation; a mode switch SW3 for selecting one mode from a single (S) mode for taking one picture or one set of pictures and voice recording, a continuous (C) mode for taking a plurality of pictures continuously or plural sets of pictures and voice recording continuously or a self (SELF) mode for taking a picture with a self timer, a switch SW4 for choosing one mode between a recording mode and non recording mode and a switch SW5 for selecting for example, the recording period, the recording quality or the numbers of the recording channel, etc.

The system control circuit 1 stores data from the above mentioned switches SW0 to SW5, in advance of a phototaking operation or a voice recording operation.

Thereafter, a predetermined phototaking or voice recording operation is carried out under program control.

Operation of the first preferred embodiment will be explained, with reference to FIGS. 2, 3, 4 and 5.

Figure 2:
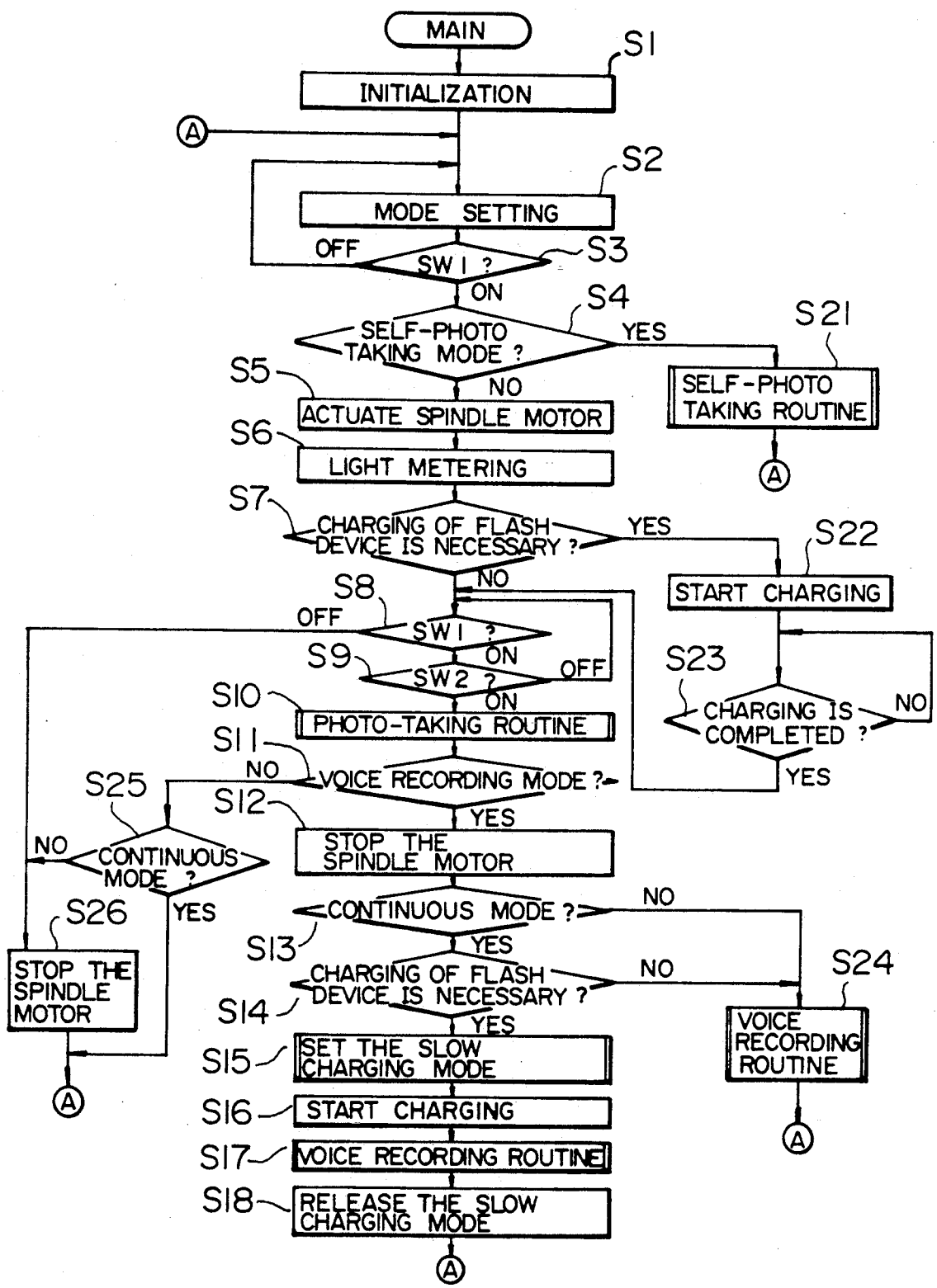
FIG. 2 illustrates a main flow chart for explaining an operation of the first embodiment.

FIG. 2 illustrates a main flow chart. In the figure, the system control circuit (CPU) 1 carries out an initial setting operation when the power is turned on in accordance with the signal from the switch SW0 that is, for example, the initializing of flags or of the content of a memory contained within the CPU and resetting the position of the magnetic head 8 etc (S1).

On completing the initial setting operation, the system control circuit 1 scans conditions of the group of switches 2 and, according to the state of said switches, it sets a phototaking mode and voice recording mode (S2). Next, the system control circuit 1 detects the condition of a switch SW1 (S3) and if it is off, the circuit 1 returns to step S2, and if it is on, the circuit 1 proceeds to the step S4. The system control circuit 1 detects if the self timer mode is set (S4), if so it carries out the self timer routine at step S21 and, if not it, makes the spindle motor 14 turn on at step S5. Thereafter, the circuit 1 introduces the output of the light metering device 16 at step S6. According to the output from the light metering device 16, the system control circuit 1 judges whether flash light is needed or not at step S7. If light is needed, it initiates charging of the flash device 17 S22 and, if the charging operation is completed, the system control circuit 1 proceeds to step S8 at step S23. Here the detection of the completion of the charging of the flash device can be carried out by detecting a voltage difference between both terminals of a charging capacitor in the flash device 17, by the system control circuit 1. If the charging of the flash device is not necessary, the system control circuit 1 proceeds from the step S7 to a step S8.

The next stage is for the system control circuit 1 to detect the condition of the light metering switch SW1 and the release switch SW2 in this order at steps S8, S9, and if the light metering switch SW1 is off, the system control circuit 1 makes the spindle motor 14 stop at step S26, and then returns to step S2. If the release switch SW2 is on, a phototaking routine is carried out at step S10. Once the phototaking operation has finished, the system control circuit 1 detects whether the voice recording mode is set or not at step S11, and if it is not set, the system control circuit 1 detects whether the continuous mode is set or not at step S25, if the continuous mode is set, the circuit 1 returns to the step S2, and if the continuous mode is not set, the circuit 1 makes the spindle motor 14 stop at S26 and returns to step S2.

If the voice recording mode is set, the control circuit 1 makes the spindle motor 14 stop at step S12, and circuit 1 detects whether the continuous mode is set or not and whether the flash is needed or not in this order at steps S13 and S14. If both of the detected results are negative, the circuit 1 carries out a recording routine at step S24. If the continuous mode is set and the flash is necessary the system control circuit 1 carries out a slow charging mode set routine at step S15.

Figure 6:
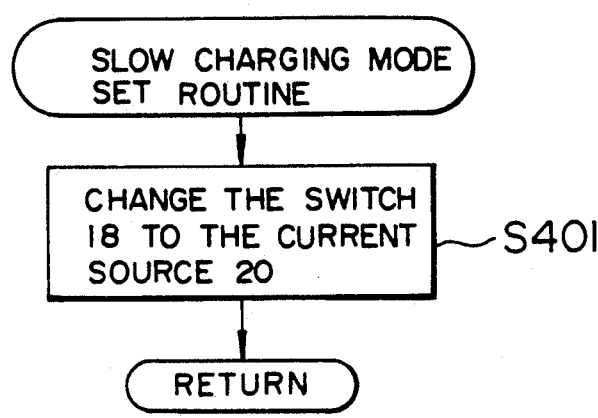
FIG. 6 illustrates a flow chart relating to a slow charging mode routine.
Figure 8:
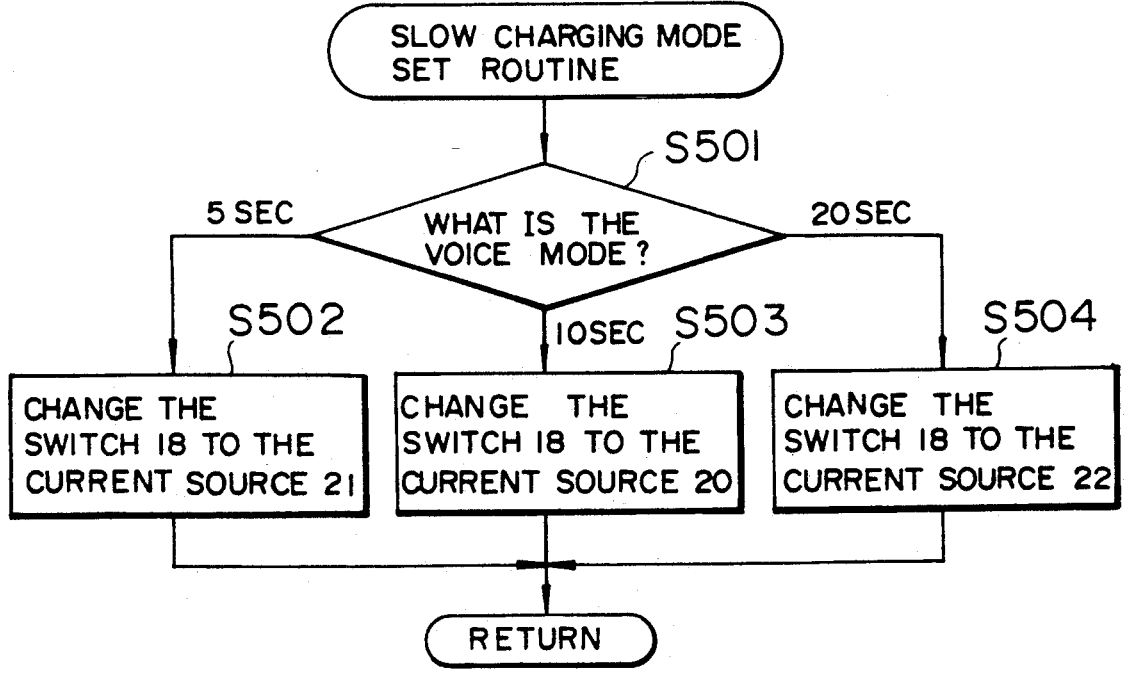
FIG. 8 illustrates a flow chart relating to a slow charging mode routine for the second embodiment.

FIG. 6 illustrates the slow charging mode set routine. In this embodiment, quick charging is carried out by supplying a large current from the large current source 19 through the switch 18 to the flash device 17. On the other hand, in the slow charging mode a small current is supplied from a small current source 20 through the switch 18 to the flash device 17. Charge current is set so as to finish charging over a period corresponding to the recording period in the recording routine.

Going back to FIG. 2, at step S16 the system control circuit 1 starts charging the flash device 17, and then carries out the recording routine at step S17. After completing the recording, the system control circuit 1 changes charging modes from the slow charging mode 2 to the quick charging mode at step S18, and then returns to step S2.

Therefore, if the charging operation for the flash device 17 is not completed, by carrying out step S22, the deficiency of charging can be quickly compensated by the quick charging operation.

Figure 3:
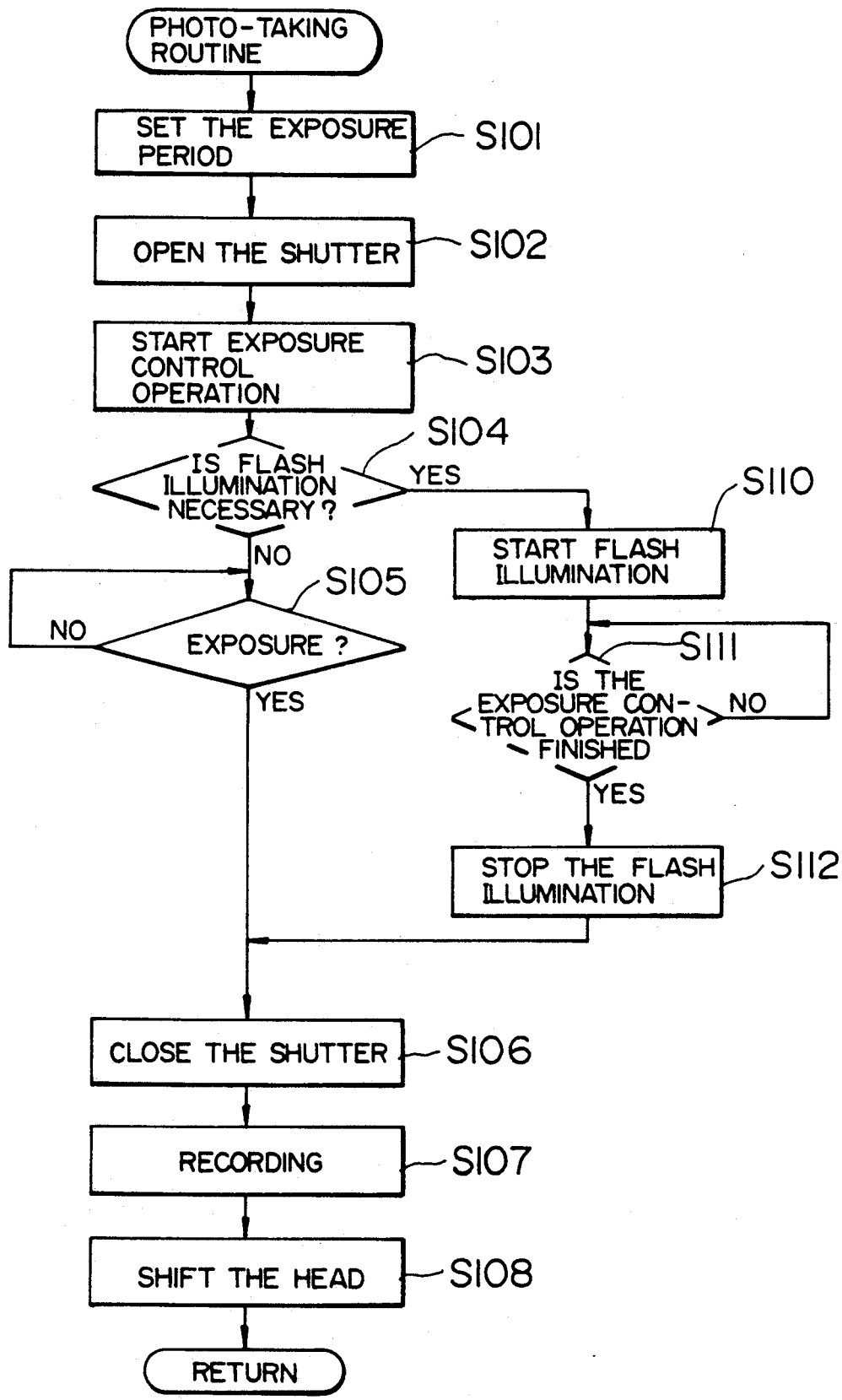
FIG. 3 illustrates a flow chart relating to a phototaking routine.

The phototaking routine at step S10 will now be explained, with reference to FIG. 3. The system control circuit 1 computes an exposure period based on the output from the light metering output at step S6, and the exposure period is then set in a register in the system control circuit 1 at step S101. Circuit 1 supplies a signal to the driver 36 to make the image pick up device start accumulation at step S102, and the system control circuit 1 starts the light metering operation and counting of the exposure period at step S103. Thereafter, the system control circuit 1 judges whether flash illumination is needed or not at step S104, and if it is necessary, the system control circuit 1 operates the flash device 17 at step S110. Thereafter, by detecting the level or duration of exposure at step S111, the circuit 1 switches the flash device 17 off at step S112. If flash illumination is not necessary, the system control circuit 1 continues the light metering operation until either the amount of exposure reaches a predetermined level or the predetermined exposure period has passed at step S105.

The system control circuit 1 supplies a signal to the driver circuit 6 to make the image pick up device stop accumulation at step S106. The accumulated charger signal in the image pick up device 5 is read out in synchronism with the PG signal by the driver circuit 6 and, after the read out signal is processed in the video recording circuit 7, the processed signal is recorded through the magnetic head 8 on to the magnetic disk 9 at step S107. After the completion of recording, the system control circuit 1 makes the magnetic head 8 move to the predetermined position by using the stepping motor 15.

Figure 4:
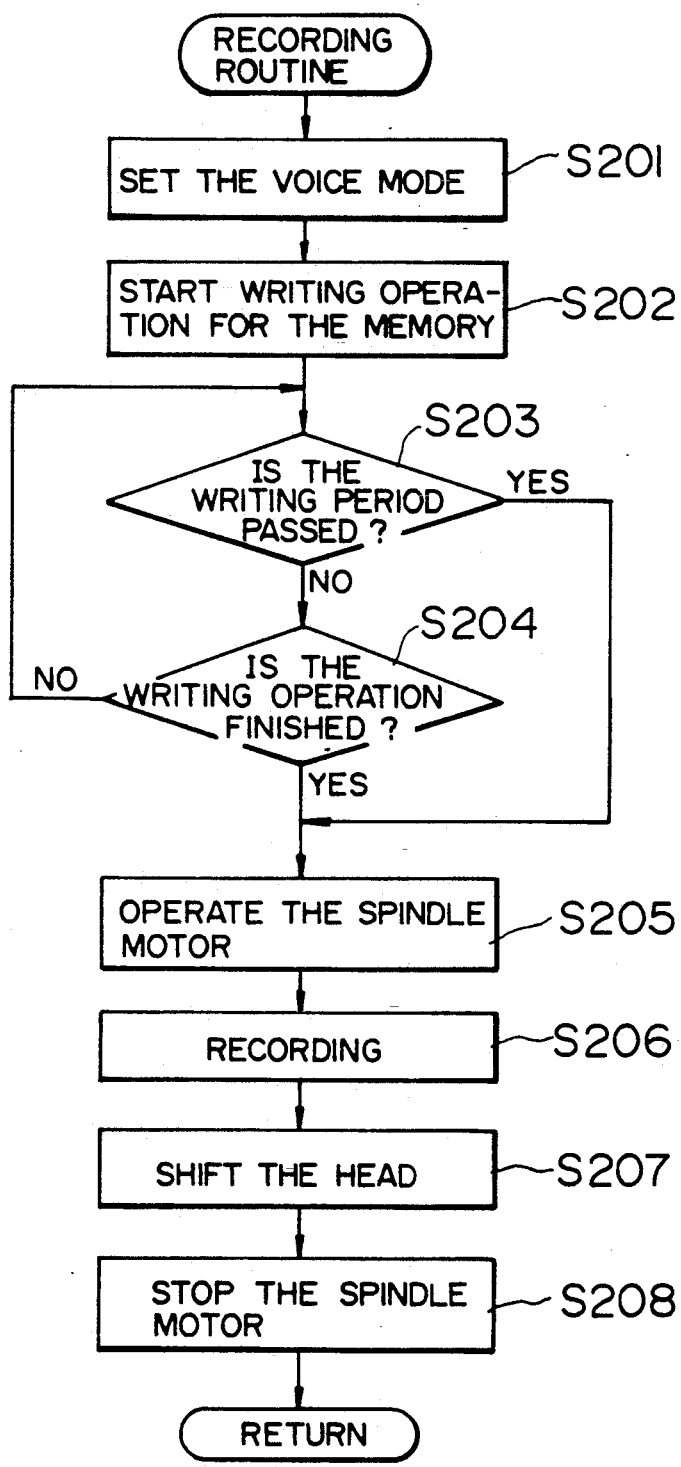
FIG. 4 illustrates a flow chart relating to a recording routine.

The recording routine at steps S17, S24 will now be explained with reference to FIG. 4. The system control circuit 1 reads out the recording mode input at step S2 from the RAM in the system control circuit 1 and, according to the read out recording mode information, the circuit 1 sets the recording condition at step S201. By this, a recording bandwidth and recording period etc are set in the voice circuit 11. The system control circuit 1 processes a voice signal picked up by the microphone 10 and then writes the processed voice signal in a voice memory in the voice circuit 11 at steps S202. This voice writing operation is carried out until a stop signal is supplied to the input from the group of switches 2 or a preset period has passed, at steps S203 or S204 respectively.

After the completion of the writing operation, or the stopping of the writing operation by the group of switches 2, the system control circuit 1 makes the spindle motor 14 start at step S205, then, in synchronism with the PG signal, it reads out the written voice signal from the voice memory. The control circuit processes the voice signal in the voice circuit 11 and the video recording circuit 7, and records it on the magnetic disk through the magnetic head 8 at step S206. After the completion of recording, the system control circuit 1 moves the magnetic head 8 to a predetermined position by the stepping motor 15 at step S207, and then makes the spindle motor 14 stop at step S208.

Figure 5:
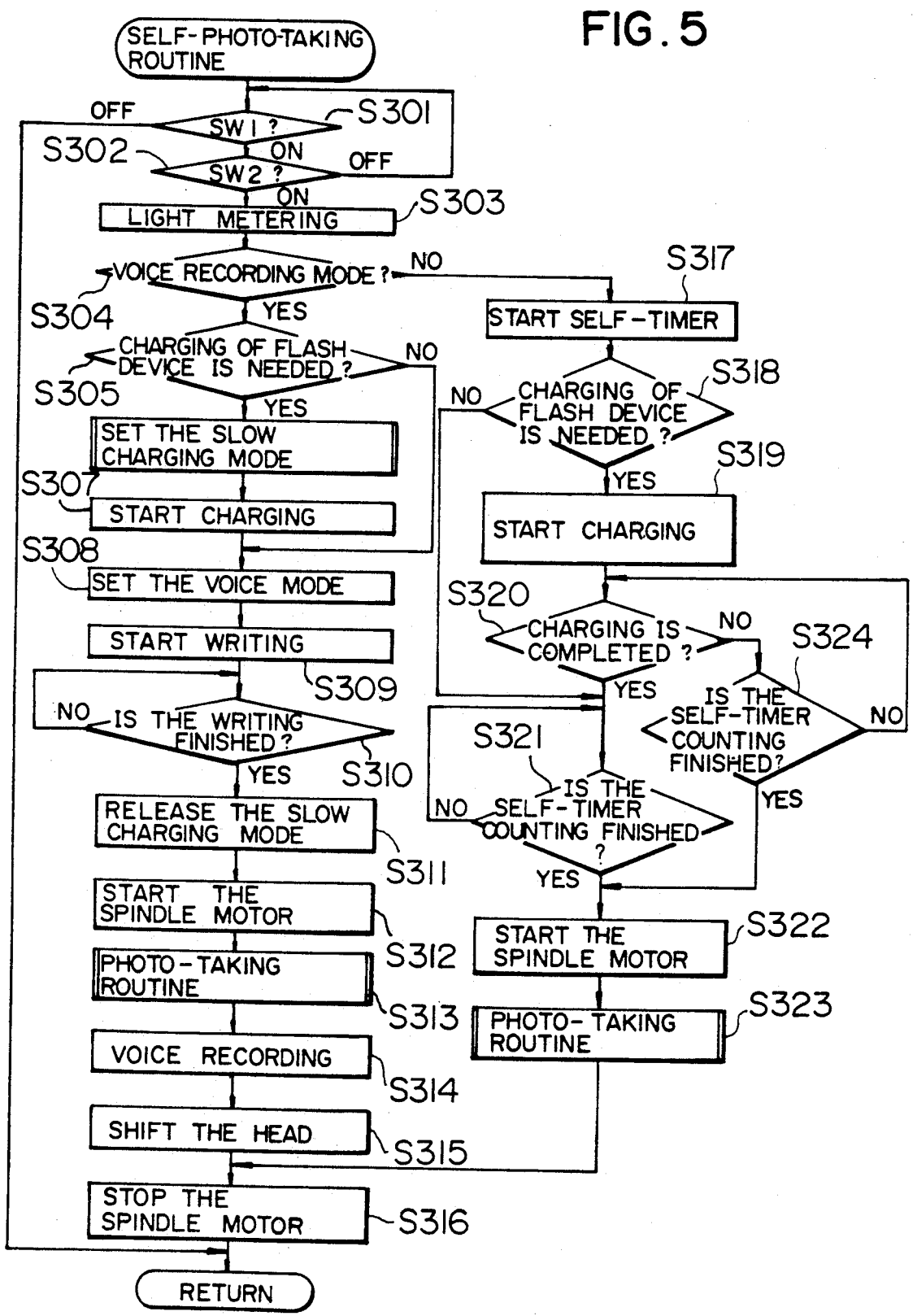
FIG. 5 illustrates a flow chart relating to a set of phototaking mode routine.

The self timer routine at step S21 will now be explained with reference to FIG. 5. The system control circuit 1 detects the conditions of the light metering switch SW1, the release switch SW2 at respective step S301, S302, and if the light measuring switch SW1 is off, the control circuit 1 makes the self timer routine stop. If the release switch SW2 is on, the circuit 1 detects brightness of the object by using the light metering device 16 at step S303. Then the system control circuit 1 detects whether the recording mode is set or not at step S304 and if it is set, the circuit 1 proceeds to the step S305 whereas, if the recording mode is not set, the circuit 1 proceeds to the step S317.

When the recording mode is set, the system control circuit 1 judges whether flash illumination is necessary at step S305 and if it is necessary, the circuit 1 sets the slow charging mode of the flash at step S306 and, after that, the charging operation by the flash device 17 is started at step S307. If flash illumination is not necessary, the processes at steps S306, S307 are not carried out.

Thereafter, the system control circuit 1 reads out the recording mode input at step S2 from the RAM in the system control circuit 1 then, according to the read out recording mode, the circuit 1 sets the recording mode at step S308. The system control circuit 1 processes the voice signal picked up by the microphone 10 and writes the processed voice signal into the voice memory, in the voice circuit 11 at step S309. This writing operation is carried out until the preset recording period has passed at step S310. During steps S308 to S310, the display device 3 indicates that the self timer operation is on. After the completion of writing the voice signal into the voice memory, the system control circuit 1 releases the slow charging mode at step S311, and makes the spindle motor 14 start at step S312.

The system control circuit 1 carries out the aforementioned phototaking routine at step S313. After the completion of the phototaking routine, the system control circuit 1 reads out the voice signal from the voice memory, in synchronism with the PG signal. Said circuit 1 processes the signal at the voice circuit 11 in the video recording circuit 7 and records it onto the magnetic disk 9, through the magnetic head 8, at step S314. After completion of voice recording, the system control circuit 1 moves the magnetic head 8 to the predetermined position by using the stepping motor 15 at step S315 and makes the spindle motor 14 stop at step S316.

At step S304, if the voice mode is not set, the system control circuit 1 starts counting for the self timer operation at step S317, then the system control circuit 1 indicates that the self timer operation is on by the display device 3. The system control circuit 1 judges whether flash illumination is necessary or not at step S318 and, if it is necessary, the circuit makes the flash device 17 start charging at step S319; after the charging operation has finished the circuit 1 proceeds to the step S321. If flash illumination is not necessary, the circuit 1 proceeds directly to steps S321. Thereafter, the system control circuit 1 judges whether self timer counting has finished or not, at step S321 and, if it has finished, the circuit 1 proceeds to the step S322. At step S320, even if the charging operation has not finished and if the self timer counting has finished, the circuit 1 proceeds to step S322. Thereafter, the system control circuit 1 activates the spindle motor 14 at step S322 and, after carrying out the aforementioned phototaking routine at step S323, activates the spindle motor 14 at step S316.

As explained above, according to the first embodiment, when the charging of the flash battery is carried out during the recording procedure, slow charging of flash device is carried out, independently of voice recording period. Therefore, the fluctuation of the source voltage and the oscillation noise by quick charging can be avoided and the time lag for the next phototaking operation can be reduced significantly.

Furthermore, after the completion of recording, if the charging operation is not finished, the quick charging operation is carried out just after it so the time lag is reduced to a minimal level.

FIG. 7 illustrates a schematic circuit diagram of the electronic still camera of the second embodiment of the present invention. The difference between the first embodiment and the second embodiment is that the latter has several current sources for charging the flash device. An operation of this embodiment is explained with reference to FIGS. 2, 3, 4, 5 and 8, with emphasis on the elements which are different between the embodiments.

The system control circuit 1 reads out the recording mode input at the step S2 from the RAM in the system control circuit 1 and, according to the read out data, the circuit 1 judges which recording mode is selected at step S501.

In this embodiment the recording mode has for example three different recording period options, such as 5 seconds, 10 seconds and 20 seconds. The voice circuit 11 is then respectively connected to a current source 21, 20 or 22 when the 5 seconds mode, the 10 second mode, or the 20 second mode is selected at step S502.

In this embodiment, the current levels of the current sources 21, 20, 22 are respectively set according to the 5 second mode, the 10 second mode or the 20 second mode to ensure that the charging operation can be finished by the end of the recording period. After the selected operation of the current source has finished, the system control circuit 1 finishes the slow charge mode set routine.

As explained above according to the second embodiment, not only has it the similar effect as the first embodiment but, in addition, this embodiment can minimize the time lag for the next phototaking operation. However, it should be emphasized that this invention is not limited to the aforementioned embodiments.

Figure 9:
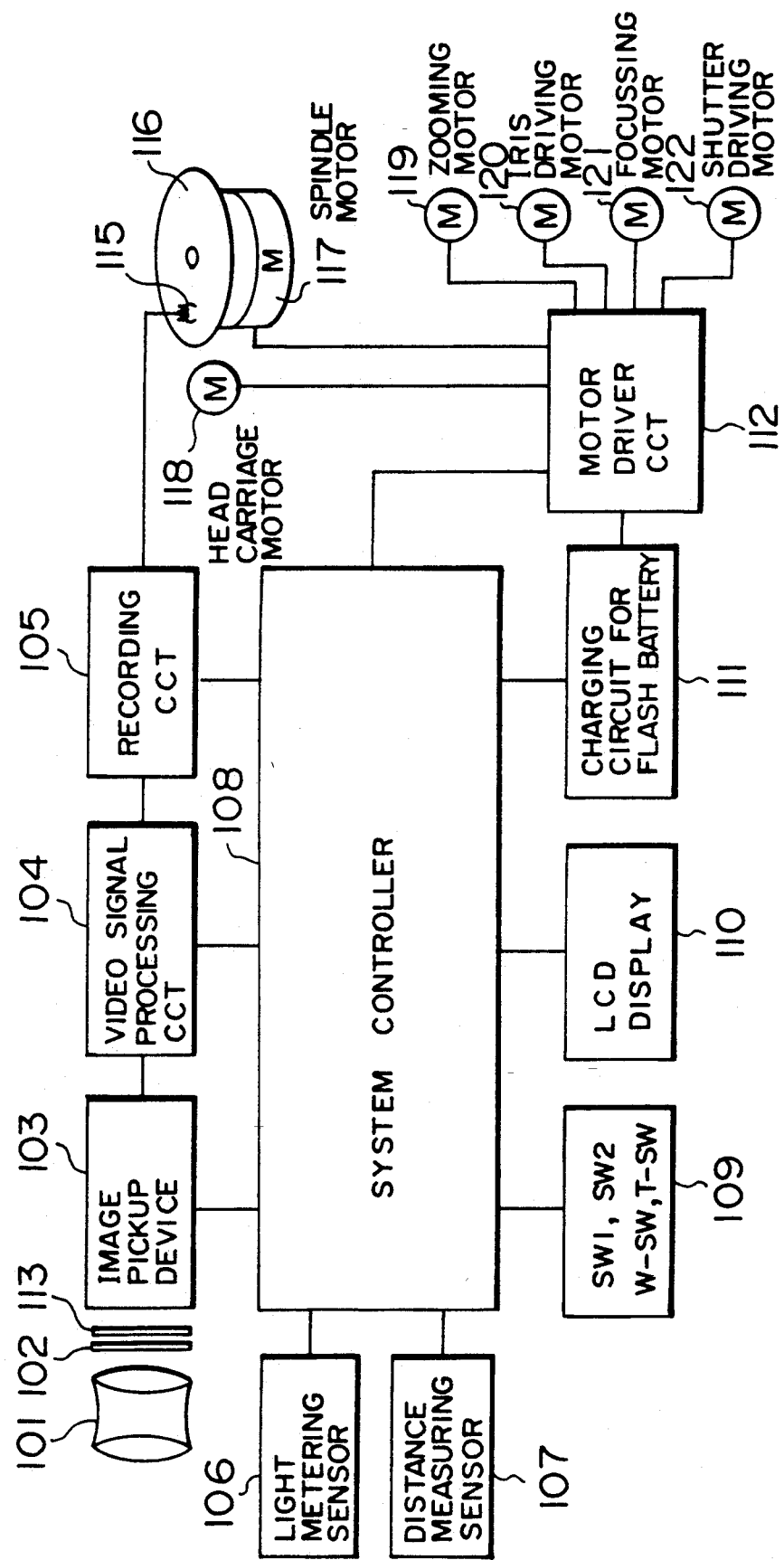
FIG. 9 illustrates a schematic circuit diagram of a third embodiment of the present invention.

FIG. 9 illustrates as schematic circuit diagram of the electronic still camera of the third embodiment of the present invention. An image pick up optical system 101 is located in front of the image pick up device 103 for introducing an optical image on to the image pick up device 103. An iris 102 is located between the optical system and the image pick up device 103 for adjusting an amount of light incident on the image pick up device 103. A shutter device 113 is located between the iris 102 and the image pick up device 103. A video signal processing circuit 104 is connected to an output terminal of the image pick up device 103 for converting an image signal from the image pick up device 103 to a standard video signal that follows a standard format for still video recording. A recording circuit 105 is connected to an output port of the video signal processing signal circuit 104, for modulating the output signal from the video signal processing circuit 104 to a signal suitable for recording on a magnetic disk 116 through a magnetic head 115.

A light metering sensor 106 for detecting brightness of an object is connected to a system controller 108. A distance measuring sensor 107 for measuring the distance to the object is connected to the system controller 108 and a group of switches 109 is connected to the system controller 108 for inputting instruction data thereto. An LCD display device 110 is connected to the system controller 108 for indicating a condition of the camera system. A charging circuit for a flash device 111 is connected to the system controller 108 along with a motor drive 112. The motor drive 112 drives a spindle motor 117, a head carriage motor 118, a zooming motor 119, an iris driving motor 120, a focusing motor 121 and a shutter driving motor 122.

The spindle motor 117 is for rotating the magnetic recording disk 116 at a constant speed, and the head carriage motor 118 is for moving the magnetic head 115 to a predetermined track of the magnetic disk 116. The zooming motor 119 is for driving a part of the optical system 101 to carry out the zooming operation. The iris driving motor 120 controls an amount of an aperture of the iris 102. The focusing motor 121 is for driving a part of the optical system 101 to focus the image. The shutter driving motor 122 is for opening or closing the shutter 113.

Figure 12:
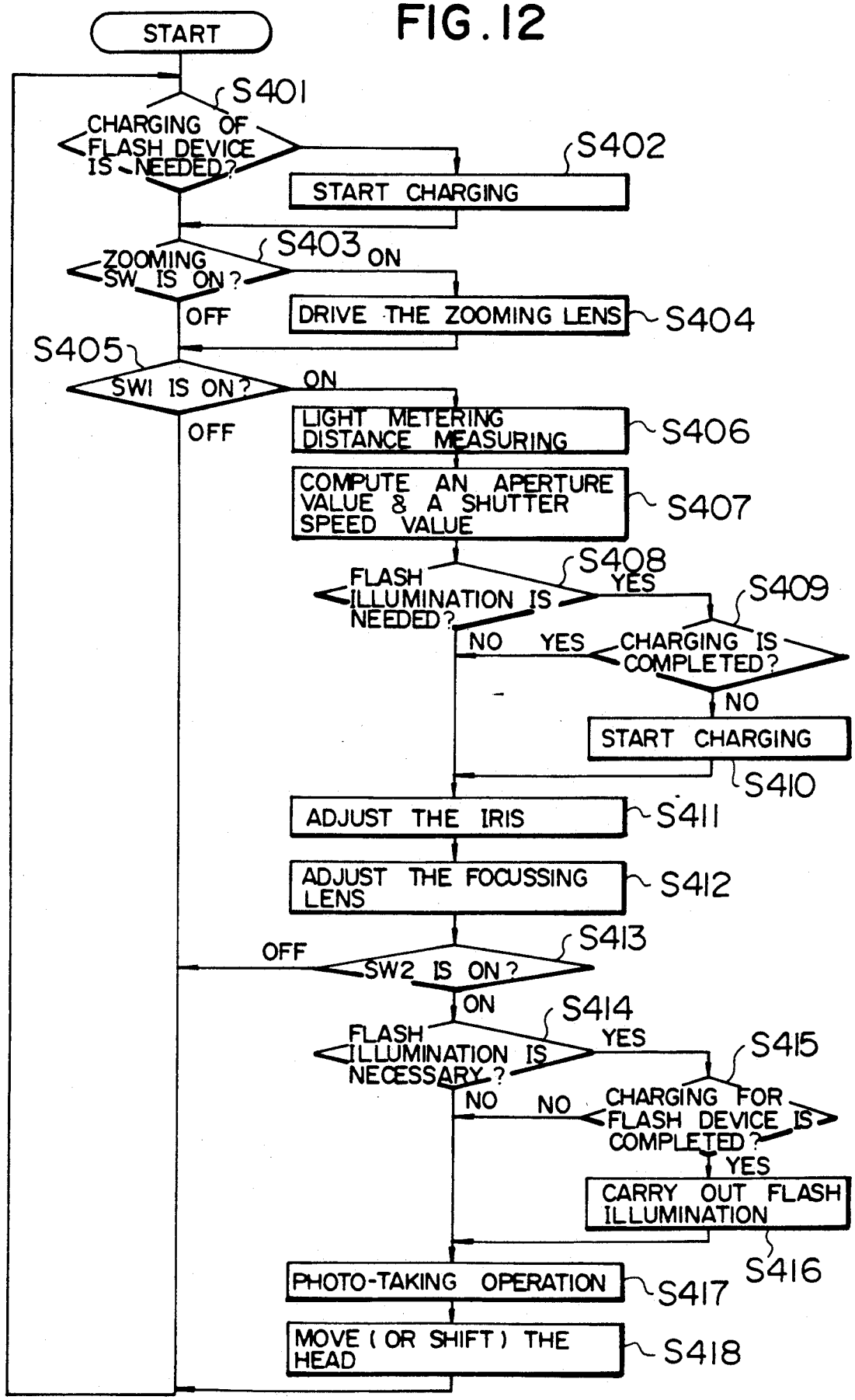
FIG. 12 illustrates a main flow chart of the first embodiment.

An operation of the electronic still camera will now be explained with reference to FIG. 12. Firstly, at step S401, the system controller 108 determines whether the changing operation of the flash device is or is not necessary. If it is necessary, the system controller 108 proceeds to the next step S403. If the charging operation for the flash device is necessary at the step S401, the system controller 108 makes the charging circuit 111 start the charging operation of the flash device at step S402, and the system controller 108 proceeds to step S403. After that at step S403, if a wide zooming switch W-SW or a tele zooming switch T-SW is on, the zooming motor 119 is actuated at step S404 but if either of zooming switches is not turned on at step S403, the system controller 108 proceeds to a step S405.

If, during the charging operation of the flash device, the zooming operation is carried out, the system controller 108 makes the charging circuit 111 reduce the level of charging current taken from the battery. By this, an excessive voltage drop of a main voltage source can be prevented, so that the operation of the zooming motor 119 can be kept stable.

The system controller 108 (FIG. 12) detects whether a light metering switch SW1 is on or off at step S405 and if it is on, the charging operation is stopped, even if it is not completed. Thereafter, the system controller 108 makes the light metering sensor 106 and the distance measuring sensor 107 detect brightness and distance of the object, respectively, at step S406 and the system controller 108 computes an aperture value and a shutter speed value based on the detected results at step S407.

After this the system controller 108 detects whether flash illumination is necessary or not at step S408 and, if it is necessary, the system controller 108 detects whether the charging operation of a main capacitor, which is a main current source for a flash bulb, is completed or not at the step S409. If a further charging operation is necessary, the charging operation of the main capacitor is started again at step S410. If flash illumination is not necessary at step S408 or the charging operation is completed at step S409, the system controller 108 proceeds to a step S411.

At step S411, the system controller 108 makes the motor driver 112 drive the iris driving motor 120 so as to adjust the iris 102 to the aperture value computed at step S407. At step S412 the system controller 108 makes the motor drive 112 drive the focus motor 121 so as to adjust a focusing distance according to the predetermined distance information obtained by the distance measuring sensor 107.

Meanwhile if the step S410 of the charging operation has been started, the charging operation is still carried out at this stage. However, while this charging operation is being carried out during steps S411, S412, the charging current is reduced to a certain level, so as not to cause an excessive voltage drop across the main battery.

As explained above the operations from steps S405 to S412 are carried out repeatedly if the light measuring switch SW1 is on until a release switch SW2 turns on.

Next at step S413 the release switch SW2 is turned on, the charging operation of the flash device is once stopped, and if at step S414 the flash illumination is necessary then at step S415 the system controller 108 detects whether the charging operation of the main capacitor is completed or not and, if it is completed, the system controller 108 makes the charging circuit 111 start the flash illuminating operation at step S416. Thereafter, the system controller 108 makes the motor drive 112 drive the shutter driving motor 122 so as to open the shutter 113 for a predetermined period, for phototaking at step S417.

By this operation the optical image is exposed to the image pick up device 103 through the optical system 101 while the shutter 113 is opened and the optical image is converted to an electric image signal. This electric image signal is read out sequentially from the image pick up device 103 and is supplied to the video signal processing circuit 104. The video signal is converted to a signal suitable for the still video recording format and is thereafter recorded on the magnetic disk 116 through the recording circuit 105.

After the recording operation of one picture, the magnetic head 115 is moved to a predetermined track of the magnetic disk 116 by the head carriage motor 118 at step S418. The system controller 108 stops the rotation of the magnetic disk 116, so as to prepare for the next phototaking operation, thus completing the phototaking sequence.

Figure 11:
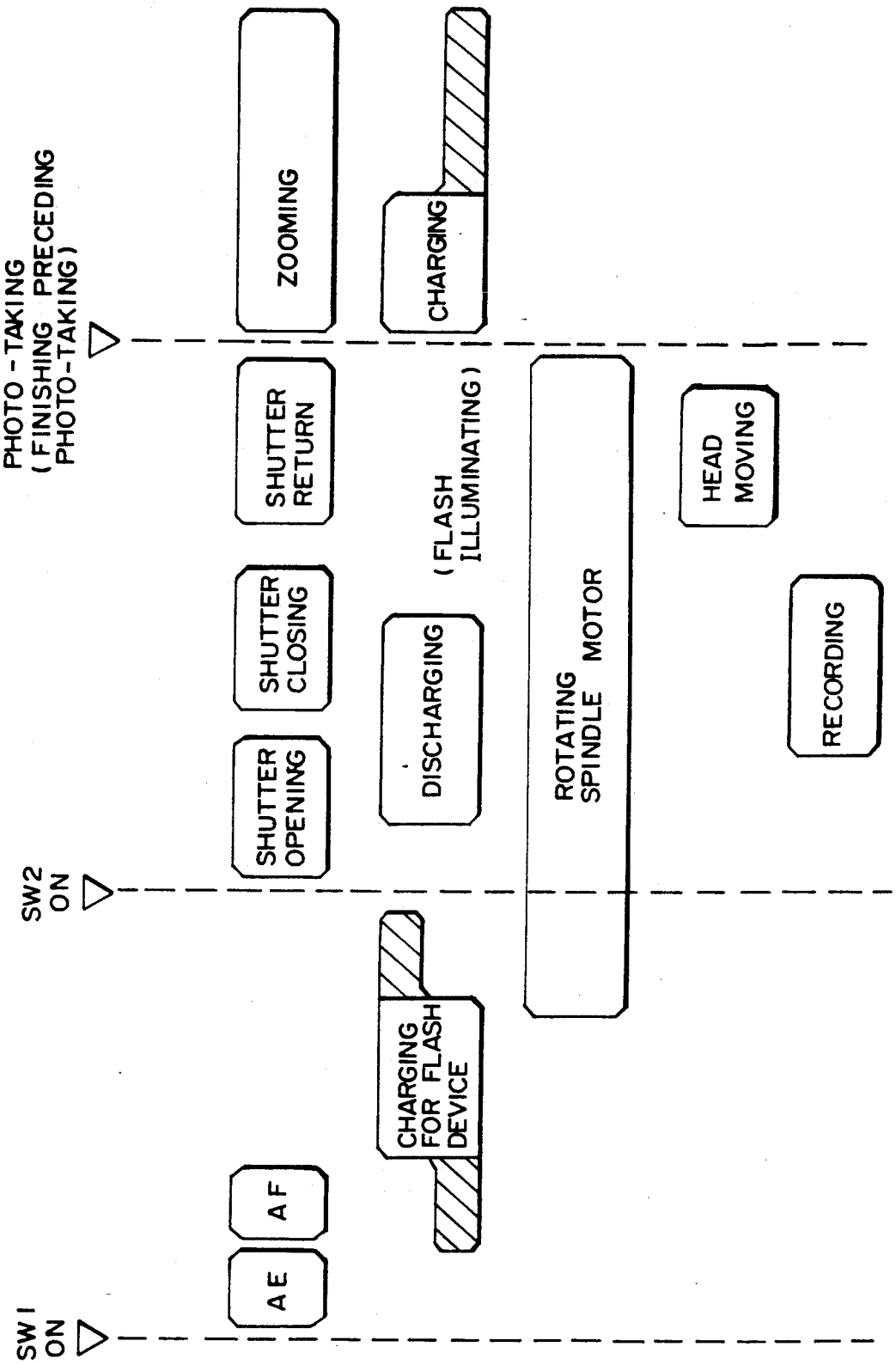
FIG. 11 illustrates a figure for explaining a sequence of the phototaking operation of the first embodiment.

FIG. 11 illustrates a schematic sequence of the above mentioned phototaking operation. In the figure, the hatched part shows the special charging operation period, which is carried out by supplying a predetermined reduced current to the flash device.

Figure 10:
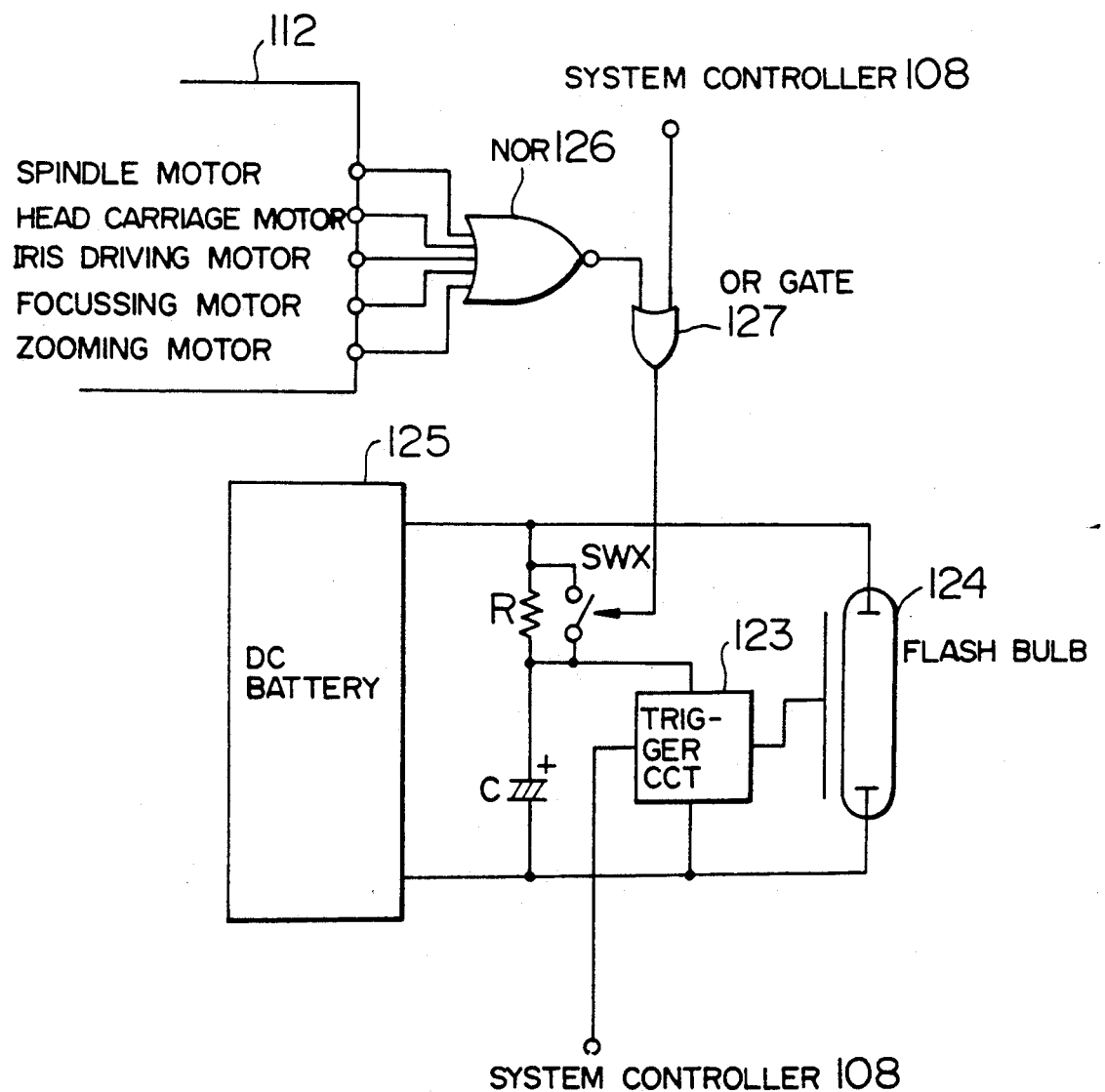
FIG. 10 illustrates a schematic circuit diagram of a charging circuit.

Next FIG. 10 illustrates a schematic circuit diagram of the charging circuit 111. The main capacitor C is connected to a current restricting resistor R serially and a switch SWX is connected to the resistor R in parallel. The switch SWX is turned on either by a signal from the system controller 108 or an output of a NOR gate 126, so as to short circuit the current restricting register R.

Inputs to a NOR gate 126 are connected to output from the motor driver 112, so as to make the output of the NOR gate 126 high if any one of motors is not operated. Thus, if any one of the motors are operated, the switch SWX is turned off so that the capacitor C is charged by a relatively small current through the resistor R. If all of the motors are stopped, the switch SWX is turned on so that the quick charge operation is carried out. While a DC battery 125 is connected to a flash bulb 124, a trigger electrode of the flash bulb 124 is connected to a trigger circuit 123. The trigger circuit 123 is connected to terminals of capacitor C and is triggered by a signal from the system controller 108. If the signal from the system controller 108 is supplied to the trigger circuit 123, the triger circuit 123 triggers the flash bulb 124 to start flash illumination.

As explained above in this embodiment, when driving motors, the system controller 108 makes the charging circuit 111 carry out charging operations by a relatively small current so that, even during the driving of motors, the main capacitor C is charged in a proper way.

Figure 13:
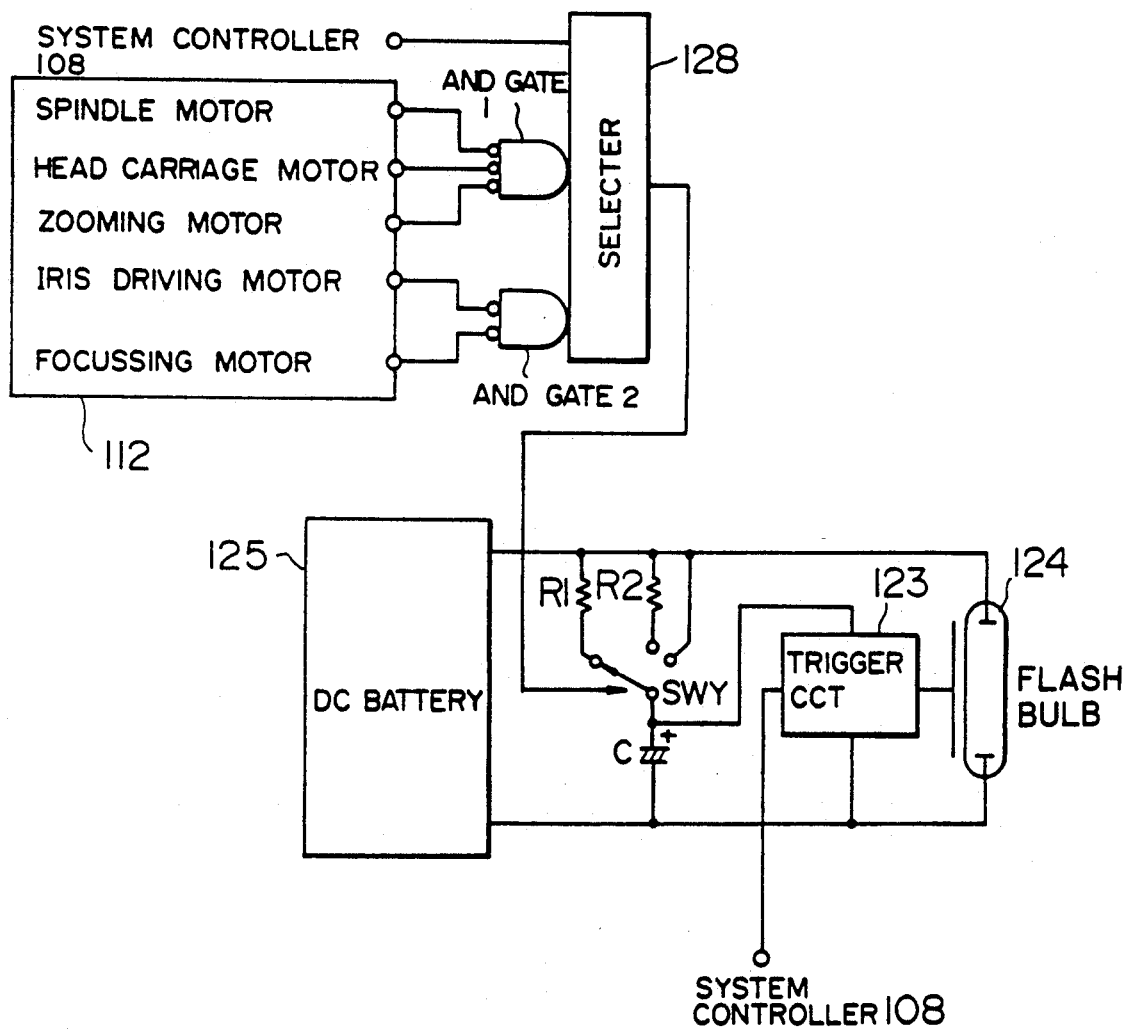
FIG. 13 illustrates a schematic circuit diagram of the charging circuit of another embodiment.

FIG. 13 illustrates a schematic circuit diagram, in which a capacitor C is connected to a resistor R1, a resistor R2 or a conductive line, selectively operable by a switch SWY. The switch SWY is controlled by a selector 128 and an input to the selector 128 is connected to the system controller 108 Other inputs to the selector 128 are connected to the motor driver 112 through an AND gate 1 and an AND gate 2.

FIG. 14 illustrates a table for explaining the relationship between an output signal from the system controller 108, an output signal from the AND gate 1, an output signal from the AND gate 2 and controlled conditions of the switch SWY. While the resistance of resistor R1 is larger than the resistance of resistor R2. As can be understood from the FIG. 14, when the output of the system controller 108 is negative the charging operation is stopped and if all the motors are stopped, the switch SWY is connected to the conductive line so that the quick charging operation is carried out, and if one of the output signals from said gate 1 and gate 2 is low, that is, a few of the motors are operated, the switch SWY is connected to the resistor R2, so that a medium level of current is supplied from the DC battery 125 to the main capacitor C. If all of the outputs of gate 1 and gate 2 are low, that is, more of the motors are being operated, the switch SWY is connected to the resistor R1, that is the least amount of current is supplied to the main capacitor C. Therefore, in this embodiment, according to the load of the battery, the most suitable charging current is selected so that the charging period can be minimized.

As explained above according to the present invention, even during the driving of the motors, the charging operation of the flash device can be maintained so that the total charging period can be shortened. According to the present embodiment, when the motor is driven, the reduced current is supplied to the flash device for charging and when the motor is stopped the quick charging operation is carried out, so that the total charging period is minimized.

Meanwhile this invention is not limited to the above mentioned embodiments.

What is claimed is:

1. A camera for taking still pictures, comprising:
   a flash device for illuminating a scene;
   a source of electrical energy;
   an accumulating device arranged to receive energy from said source and to supply energy to said flash device; and
   a secondary device arranged to receive energy from said source; characterized by
   control means for supplying a reduced, but not a zero, level of energy to said charging device while energy is being supplied to said secondary device.

2. A camera according to claim 1, wherein said control means allows rapid charging of said accumulating device when said secondary device is not being operated.

3. A camera according to claim 1, wherein said secondary device is a voice recording circuit.

4. A camera according to claim 3, wherein said voice recording circuit has a plurality of selectable settings.

5. A camera according to claim 4, wherein said control means supplies a variable level of current to said charging means in response to said selected settings.

6. A camera according to claim 1, wherein said secondary device is a motor.

7. A camera according to claim 6, wherein said motor drives a lens.

8. A camera according to claim 1, wherein said power source is a battery.

9. A camera according to claim 1, wherein said secondary device includes a plurality of motors and the charging current varies dependently upon the number of motors being operated.

10. A camera according to claim 1, having electronic means for storing an image electronically.

11. A method of charging a charging device of a flash device in a still camera having a secondary powered device comprising the steps of:
    supplying energy to the secondary powered device when the secondary powered device requires energy; and
    supplying a reduced, but not a zero, level of energy to said charging device while energy is being supplied to said secondary powered device.

12. A method according to claim 11, wherein current is rapidly supplied to said charging device while current is not required by said secondary powered device.

* * * * *

UNITED STATES PATENT AND TRADEMARK OFFICE
CERTIFICATE OF CORRECTION

PATENT NO. : 5,260,738               Page 1 of 3
DATED : November 9, 1993
INVENTOR(S) : Yoichi Yamagishi, et al.

It is certified that error appears in the above-indentified patent and that said Letters Patent is hereby corrected as shown below:

IN THE DRAWINGS - SHEET 8 OF 13:

FIGURE 9:

"FOCUSSING" should read --FOCUSING--.

IN THE DRAWINGS - SHEET 9 OF 13:

FIGURE 10:

"FOCUSSING" should read --FOCUSING--.

IN THE DRAWINGS - SHEET 11 OF 13:

FIGURE 12:

"FOCUSSING" should read --FOCUSING--.

IN THE DRAWINGS - SHEET 12 OF 13:

FIGURE 13:

"FOCUSSING" should read --FOCUSING--.

UNITED STATES PATENT AND TRADEMARK OFFICE
CERTIFICATE OF CORRECTION

PATENT NO. : 5,260,738
DATED : November 9, 1993
INVENTOR(S) : Yoichi Yamagishi, et al.

It is certified that error appears in the above-indentified patent and that said Letters Patent is hereby corrected as shown below:

COLUMN 1:

line 42, "recorders etc)" should read --recorders, etc.)--.

COLUMN 4:

line 17, "non recording" should read --non-recording--.

COLUMN 6:

line 7, "period" should read --period,--.
line 8, "etc" should read --etc.--.

COLUMN 7:

line 17, "finished" should read --finished,--.
line 19, "steps" should read --step--.
line 55, "embodiment" should read --embodiment,--; and "has" should read --has,--.
line 56, "ple" should read --ple,--.

UNITED STATES PATENT AND TRADEMARK OFFICE
CERTIFICATE OF CORRECTION

PATENT NO. : 5,260,738                                Page 3 of 3
DATED       : November 9, 1993
INVENTOR(S) : Yoichi Yamagishi, et al.

It is certified that error appears in the above-indentified patent and that said Letters Patent is hereby corrected as shown below:

COLUMN 8:

line 1, "above" should read --above,--.
line 62, "that" should read --that,--.

COLUMN 9:

line 42, "above" should read --above,--.
line 45, "Next" should read --Next,--.
line 48, "necessary" should read --necessary,--.
line 57, "operation" should read --operation,--.

COLUMN 10:

line 11, "Next" should read --Next,--.
line 45, "108" should read --108.--.
line 53, "while the" should read --The--.

COLUMN 11:

line 3, "above" should read --above,--.

Signed and Sealed this

Fourteenth Day of June, 1994

*Attest:*

BRUCE LEHMAN

*Attesting Officer*          Commissioner of Patents and Trademarks